US010460503B2

(12) United States Patent
Hu et al.

(10) Patent No.: US 10,460,503 B2
(45) Date of Patent: Oct. 29, 2019

(54) TEXTURING OF A THREE-DIMENSIONAL (3D) MODEL BY UV MAP IN-PAINTING

(71) Applicant: SONY CORPORATION, Tokyo (JP)

(72) Inventors: Jie Hu, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 24 days.

(21) Appl. No.: 15/906,174

(22) Filed: Feb. 27, 2018

(65) Prior Publication Data

US 2018/0253886 A1 Sep. 6, 2018

Related U.S. Application Data

(60) Provisional application No. 62/465,542, filed on Mar. 1, 2017.

(51) Int. Cl.
*G06T 15/04* (2011.01)
*G06T 17/20* (2006.01)
*G06T 11/00* (2006.01)

(52) U.S. Cl.
CPC ............ *G06T 15/04* (2013.01); *G06T 11/001* (2013.01); *G06T 17/20* (2013.01)

(58) Field of Classification Search
CPC .............................. G06T 15/04; G06T 11/001
See application file for complete search history.

(56) References Cited

U.S. PATENT DOCUMENTS

| | | | | |
|---|---|---|---|---|
| 8,948,498 | B1 | 2/2015 | Hickman et al. | |
| 2012/0013620 | A1 * | 1/2012 | Brown | G06T 13/205 345/473 |
| 2015/0187135 | A1 * | 7/2015 | Magder | G06T 17/20 345/420 |
| 2015/0325044 | A1 | 11/2015 | Lebovitz | |
| 2017/0032563 | A1 | 2/2017 | Distler et al. | |

FOREIGN PATENT DOCUMENTS

| | | | |
|---|---|---|---|
| CN | 102760285 | A | 10/2012 |
| WO | 2013/165046 | A1 | 11/2013 |

* cited by examiner

*Primary Examiner* — Said Broome
(74) *Attorney, Agent, or Firm* — Chip Law Group

(57) ABSTRACT

Apparatus ad method for texturing a 3D model by UV map in-painting, generates a first UV map from the 3D model and applies color values to the first UV map based on correspondence between a first color image and the first UV map mapped to the first region of the 3D model. A first point is detected on a boundary between a textured region and a first non-textured region within the textured region of the first UV map and a region-of-interest is detected around the first point on the boundary that is utilized to determine texture information of a specific patch of the textured region. A first portion of the first non-textured region of the detected region-of-interest is texturized to obtain a textured region-of-interest in the first UV map, which is utilized to generate a second UV map and texture the at least the first region of the 3D model.

20 Claims, 11 Drawing Sheets

TEXTURING OF A THREE-DIMENSIONAL (3D) MODEL BY UV MAP IN-PAINTING

CROSS-REFERENCE TO RELATED APPLICATIONS/INCORPORATION BY REFERENCE

This application claims priority to U.S. Provisional Patent Application Ser. No. 62/465,542 filed Mar. 1, 2017, the entire content of which is hereby incorporated herein by reference.

FIELD

Various embodiments of the disclosure relate to three-dimensional (3D) modeling and texturing technologies for 3D models. More specifically, various embodiments of the disclosure relate to texturing of a 3D model by UV map in-painting.

BACKGROUND

Advancements in the field of three-dimensional (3D) computer graphics and 3D modeling, have provided the ability to create 3D models and visualize objects in a 3D computer graphics environment. The 3D models may be imparted texture in order to visualize the 3D models realistically in the 3D computer graphics environment. Currently, the 3D models may be manually or automatically textured by application of computer generated colors. In certain scenarios, UV maps may be used to manually or automatically apply texture from color images. However, such UV maps have artifacts that appear as holes in the UV maps. Thus, the texture applied on a 3D model using such UV maps may looks artificial.

In some other scenarios, exemplar based image in-painting techniques may be utilized to texture the 3D models. In such cases, a square or rectangular patch may be selected from the textured region of the color image to texture certain non-textured region in UV maps. However, it is observed that such exemplar based image in-painting technique mostly results in stretching of the color image while texturing of a 3D mesh model. Therefore, the textured 3D model may be unrealistic, when it is visualized or rendered in 3D computer graphics environment.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus for texturing of a three-dimensional (3D) model by UV map in-painting is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
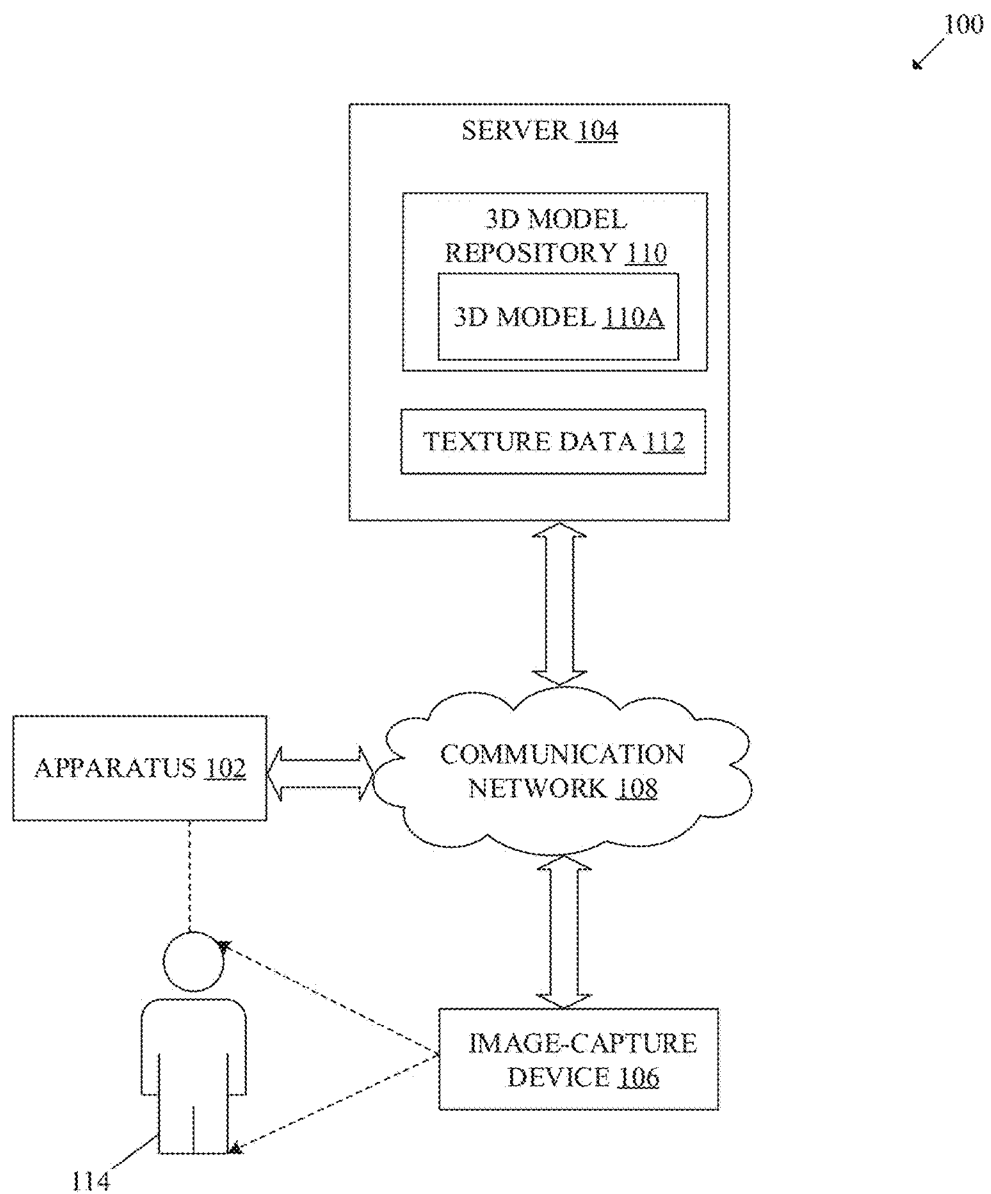
FIG. 1 is a block diagram that illustrates an exemplary network environment for texturing a three-dimensional (3D) model by UV map in-painting, in accordance with an embodiment of the disclosure.

The following described implementations may be found in the disclosed apparatus to texture a three-dimensional (3D) model by UV map in-painting. Exemplary aspects of the disclosure may include an apparatus that comprises a memory device configured to store a 3D model and a plurality of color images as texture data for the 3D model. The apparatus may further comprise a circuitry configured to generate a first UV map from the 3D model. The first UV map may be a two-dimensional (2D) layout of at least a first region of the 3D model. The circuitry may be further configured to apply color values on the generated first UV map. The color values may be applied based on a correspondence between a first color image of the plurality of color images and the first UV map mapped to the first region of the 3D model. The first UV map may comprise a textured region and a set of non-textured regions within the textured region. The circuitry may detect a first point that may lie on a boundary between the textured region and at least a first non-textured region of the set of non-textured regions within the textured region. Further, the circuitry may be configured to detect a region-of-interest around a first point on the boundary. The detected region-of-interest may comprise a first portion of the textured region and a first portion of the at least the first non-textured region in the first UV map. The circuitry may be configured to determine texture information of a specific patch of a plurality of patches of the textured region of the first UV map, based on a comparison of the detected region-of-interest with the plurality of patches of the textured region of the first UV map. The circuitry may be further configured to texturize the first portion of the first non-textured region of the detected region-of-interest to obtain a textured region-of-interest in the first UV map. The first portion of the first non-textured region of the detected region-of-interest may be texturized based on the determined texture information of the specific patch. The circuitry may texturize the first portion of first non-textured region of the detected region-of-interest, based on a comparison of the detected region-of-interest with a plurality of patches of the textured region of the first UV map. The circuitry may be further configured to generate a second UV map, based on at least the textured region-of-interest mapped to the at least the first region of the 3D model. Further, the circuitry may texture the at least the first region of the 3D model to increase photorealism in the 3D model based on the generated second UV map.

In accordance with an embodiment, the apparatus may be communicatively coupled to an image-capture device. The image-capture device may be configured to capture the plurality of color images that are stored as texture data for the 3D model in the memory device. Further, the circuitry may be configured to detect a plurality of seams for a plurality of regions of the 3D model. The circuitry may be configured to unwrap the 3D model to a two-dimensional (2D) surface plane, based on the detected plurality of seams. The first UV map be generated based on unwrap of the plurality of regions of the 3D model to the 2D surface plane. The first UV map may comprise a triangular mesh having a plurality of triangles. The color values may be applied on the first UV map, based on an affine transformation between the plurality of triangles of the triangular mesh of the first UV map and a corresponding plurality of triangles in the first color image of the plurality of color images.

In accordance with an embodiment, the circuitry may be configured to determine a priority level for each vertex of a plurality of vertices that lie on the boundary between the textured region and at least the first non-textured region. The plurality of vertices may correspond to a plurality of points including the first point that lies on the boundary. The circuitry may be further configured to detect the region-of-interest around the first point on the boundary for in-painting from a plurality of region-of-interests. The region-of-interest may be selected based on the determined priority level for each vertex of the plurality of vertices that lie on the boundary. The priority level for each vertex of the plurality of vertices may be determined, based on a confidence level of each vertex and a color gradient level of the plurality of triangles around each vertex. The circuitry may be further configured to compute the confidence level of each vertex that lie on the boundary. The confidence level of each vertex that lie on the boundary may be computed, based on a ratio of a number of textured triangles connected to each vertex and a total number of triangles connected to each vertex in a defined region-of-interest. The total number of triangles connected to each vertex may include one or more textured triangles and one or more non-textured triangles.

In accordance with an embodiment, the circuitry may be configured to compute the color gradient level of the plurality of triangles connected to each vertex that lie on the boundary. The color gradient level may be computed based on at least a gradient of color values of the plurality of triangles connected to each vertex that lie on the boundary and an angle bisector of each portion that includes the one or more non-textured triangles connected to each vertex. Further, the circuitry may be configured to update the confidence level of each non-textured triangle connected to each vertex that lie on the boundary after the first portion of first non-textured region of the detected region-of-interest is texturized.

FIG. 1 is a block diagram that illustrates an exemplary network environment for texturing a 3D model by UV map in-painting, in accordance with an embodiment of the disclosure. With reference to FIG.1, there is shown a network environment 100. The network environment 100 may include an apparatus 102, a server 104, an image-capture device 106, and a communication network 108. The server 104 may include a 3D model repository 110, which may include a plurality of 3D models (such as a 3D model 110A) that may be non-textured or partially textured 3D models. The server 104 may also store texture data 112. A user 114 may be associated with the apparatus 102 and the image-capture device 106. The apparatus 102 may be communicatively coupled to the server 104 and the image-capture device 106, via the communication network 108.

The apparatus 102 may comprise suitable logic, circuitry, and interfaces that may be configured to texture the 3D model by UV map in-painting. The apparatus 102 may be configured to in-paint the first UV map. The first UV map may include a set of non-texturized regions (e.g. left-out regions or holes) within texturized region. The first UV map may exhibit first extent of photorealism. The apparatus 102 may be configured to texturize a set of non-texturized regions within a texturized region of the first UV map. A second UV map may be generated based on the texturized set of non-textured regions. The second UV map may exhibit a second extent of photorealism that is greater than the first extent of photorealism of the first UV map. The second UV map may be further utilized to texture the 3D model to increase photorealism in the textured 3D model. Examples of the apparatus 102 may include, but are not limited to, a computing device, a video-conferencing system, a virtual reality-based device, a gaming device, a mainframe machine, a server, or a consumer electronic (CE) device.

The server 104 may comprise suitable circuitry, and interfaces that may be configured to store the 3D model repository 110. The 3D model repository 110 may include a plurality of 3D models, such as the 3D model 110A. The plurality of 3D models may be computer graphics 3D model. The 3D model 110A may be a 3D model of a human body. The server 104 may be further configured to store the texture data 112. The texture data 112 may include a plurality of color images that may be further utilized by the apparatus 102 to texture the 3D model 110A. Additionally, the server 104 may be configured to store the textured 3D model. In some embodiments, the server 104 may be implemented as a cloud server, which may be utilized to execute aforementioned operations of the server 104 through web applications, cloud applications, HTTP requests, repository operations, file transfer, gaming operations, and the like.

The image-capture device 106 may comprise suitable logic, circuitry, and interfaces that may be configured to capture a plurality of color images of the user 114. The plurality of color images may be captured from a plurality of viewing angles. The captured plurality of color images may be stored as texture data 112 in the server 104. The stored plurality of color images may be further utilized to texture the 3D model. Examples of the image-capture device may include, but are not limited to, a camera, an image sensor, a color sensor (such as a red-green-blue (RGB) sensor), and the like.

The communication network 108 may include a communication medium through which the apparatus 102 may be communicatively coupled to the server 104 and the image-capture device 106. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

In operation, the image-capture device 106 may be configured to capture a plurality of color images of the user 114. The plurality of the color images may be stored as texture data 112 in the server 104 or in the apparatus 102. The apparatus 102 may be configured to receive the stored 3D model 110A of the plurality of 3D models stored in the 3D model repository 110 and the texture data 112 from the server 104, via the communication network 108. The 3D model 110A may have a 3D mesh structure, for example, a triangular mesh structure. The apparatus 102 may be configured to detect a plurality of seams on the 3D mesh structure. The plurality of seams may be a plurality of lines that may divide the 3D model 110A in the plurality of regions. For example, the plurality of seams may divide the 3D mesh structure of a human body in the plurality of regions such as a leg region, a hand region, an upper body region, and the like. The apparatus 102 may be configured to unwrap the 3D model 110A along the detected plurality of seams. The 3D model 110A may be unwrapped on a 2D surface plane. The apparatus 102 may be configured to generate a 2D layout of the first UV map based on the unwrapped 3D model 110A. A UV map, such as the first UV map, may represent the 3D model on the 2D surface plane. The letters "U" and "V" of the UV map may denote the axes of the 2D surface plane. The 2D layout of the first UV map may be a 2D mesh that comprises a plurality of points of a plurality of polygons, such as a plurality of triangles, of the triangular mesh structure. The plurality of points of the plurality of triangles may correspond to a plurality of vertices of triangles. The plurality of points may be hereinafter referred to as "plurality of vertices". The apparatus 102 may be configured to determine coordinates for the plurality of vertices of the first UV map while unwrapping the 3D model 110A.

The apparatus 102 may be further configured to estimate a correspondence between the first UV map and a first color image of the plurality of color images stored as the texture data 112. The correspondence may be estimated based on 3D to 2D projection of the 3D coordinates of the 3D model 110A to the 2D surface plane. Alternatively stated, the 3D coordinates of the 3D model 110A may be mapped to the 2D surface of the first UV map based on 2D coordinates of the first color image and a focal length of the image-capture device 106. The apparatus 102 may be configured to compute an affine transformation between each triangle of the plurality of triangles of the first UV map and corresponding triangles of the first color image. The size of each triangle of the first UV map may differ from the size of the corresponding triangle of the first color image. The affine transformation may be computed so as to establish a relationship between the plurality of triangles of the first UV map and the corresponding triangles of the first color image. The apparatus 102 may be further configured to apply color values to the plurality of triangles of the first UV map based on the computed affine transformation and the first color image. An initial texture of the first UV map may be generated based on the applied color values to the first UV map. The initial texture of the first UV map may comprise a textured region and a set of non-textured regions within the textured region. For example, the initial texture of the first UV map may comprise a set of non-textured regions, such as holes, within the textured regions. Alternatively stated, color values from color images may be absent or missing in the set of non-textured regions of the first UV map. The first UV map after application of the color values may exhibit a first extent of photorealism.

The apparatus 102 may be configured to texture the set of non-textured regions of the first UV map to generate a second UV map with complete texture. To texture the set of non-textured regions of the first UV map, the apparatus 102 may be configured to acquire a set of vertices that lie on a boundary between the textured region and the set of non-textured regions within the textured region from the plurality of vertices of the first UV map. The apparatus 102 may be further configured to determine a priority level for each vertex of the acquired set of vertices that lie on the boundary between the textured region and the set of non-textured regions within the textured regions. The priority level may be determined to obtain an order of in-painting of the first UV map. A vertex with a higher priority level than other vertices from the set of vertices may be selected first for in-painting of the first UV map. The priority level may be determined based on a confidence level of each vertex and a color gradient level of a plurality of triangles around each vertex. The confidence level of each vertex may be computed based on a number of textured triangles and a number of non-textured triangles connected to each vertex. A textured triangle may be assigned the confidence level as "1" and a non-textured triangle may be assigned the confidence level as "0". The confidence level of each vertex may be computed based on a ratio of the number of textured triangles connected to each vertex and a total number of triangles connected to each vertex.

The apparatus 102 may be configured to compute a color gradient level of the plurality of triangles connected to each vertex that lie on the boundary. The color gradient level may be computed based on at least a gradient of color values of the plurality of triangles connected to each vertex that lie on the boundary. The computation of the color gradient level may be further based on an angle bisector of each portion that includes one or more non-textured triangles connected to each vertex.

The apparatus 102 may be configured to detect a first vertex of the set of vertices that lie on the boundary based on the determined priority level of each vertex of the set of vertices that lie on the boundary. The first vertex may lie on the boundary between the textured region and a first non-textured region of the set of non-textured regions. The apparatus 102 may be further configured to detect a region-of-interest from a plurality of region-of-interests, around the detected first vertex of the set of vertices that lie on the boundary. The detected region-of-interest may comprise a first portion of the textured region and a first portion of the first non-textured region. The apparatus 102 may be configured to determine texture information of a specific patch of a plurality of patches of the textured region of the first UV map. The texture information of the specific patch may be determined based on a comparison of the detected region-of-interest with the plurality of patches of the textured region of the first UV map. For example, a patch that exhibits a minimum deviation in at least a shape and color values from the detected region-of-interest from the plurality of patches of the textured region of the first UV map, may be determined and selected for the texture information.

The apparatus 102 may select the specific patch for in-painting the region-of-interest based on the determined texture information of the specific patch. In-painting may be a process of texturing the set of non-textured regions within the textured region. The selected specific patch may be different for each detected region-of-interest of the plurality of region-of-interests. The selected specific patch may be a reference patch in the textured region that may have least difference from the detected region-of-interest. Alternatively stated, a plurality of parameters (for e.g. color, size, number of textured triangles, and number of non-textured triangles) of the region-of-interest may match or exhibit a relevancy that is greater than a threshold (a highly relevant patch) with a corresponding plurality of parameters of the reference patch. The selected reference patch may be rotated in order to match (or map) with the region-of-interest.

The apparatus 102 may be configured to texturize the detected region-of-interest based on the determined texture information of the selected reference patch. The region-of-interest may be texturized based on an application of color values to the non-textured triangles of the first portion of the first non-textured region. The apparatus 102 may be configured to in-paint the first UV map based on the texturized region-of-interest for each vertex of the set of vertices that lie on the boundary between the textured region and the set of non-textured regions. The apparatus 102 may be configured to update the confidence level of a plurality of texturized non-textured triangles of the first portion of the first non-textured region after texturizing of the region-of-interest, based on the computed confidence level of the first vertex of the set of vertices that lie on the boundary. That is, the confidence level of the plurality of texturized non-textured triangles of the first portion of the first non-textured region, after the texturizing of the region-of-interest, may be equal to the computed confidence level of the first vertex of the set of vertices. Further, the apparatus 102 may be configured to again determine the priority level for each vertex of the acquired set of vertices that lie on the boundary and in-paint the set of non-textured regions within the textured region until the set of non-textured regions within the textured regions of the of the first UV map is textured.

The apparatus 102 may be further configured to generate a second UV map based on the texturized region-of-interest of the first UV map. The presence of the set of non-textured regions within the textured region of the first UV map may be absent in the generated second UV map. Thus, the second UV map exhibits a second extent of photorealism that is greater than the first UV map. The apparatus 102 may texture the 3D model 110A based on the generated second UV map to increase photorealism in the 3D model 110A. Photorealism may be an extent of detailed visual representation of a color image, such as the first color image, in a computer graphics medium. Photorealism provides an indicator of how well a color image, such as the first color image, is realistically reproduced in a computer graphics medium. The apparatus 102 may be configured to generate the textured 3D model of the user 114, based the second UV map mapped to the stored 3D model 110A. The texturing of the 3D model 110A based on the generated second UV map, may increase photorealism in the 3D model as the set of non-textured regions may be textured in the second UV map. Increased photorealism may increase the realistic appearance of the 3D model 110A during rendering of the 3D model 110A on a display screen. The apparatus 102 may be further configured to display the generated textured 3D model of the user 114 on the display screen that exhibits improved photorealism while viewing the generated textured 3D model of the user 114 on the display screen.

Figure 2:
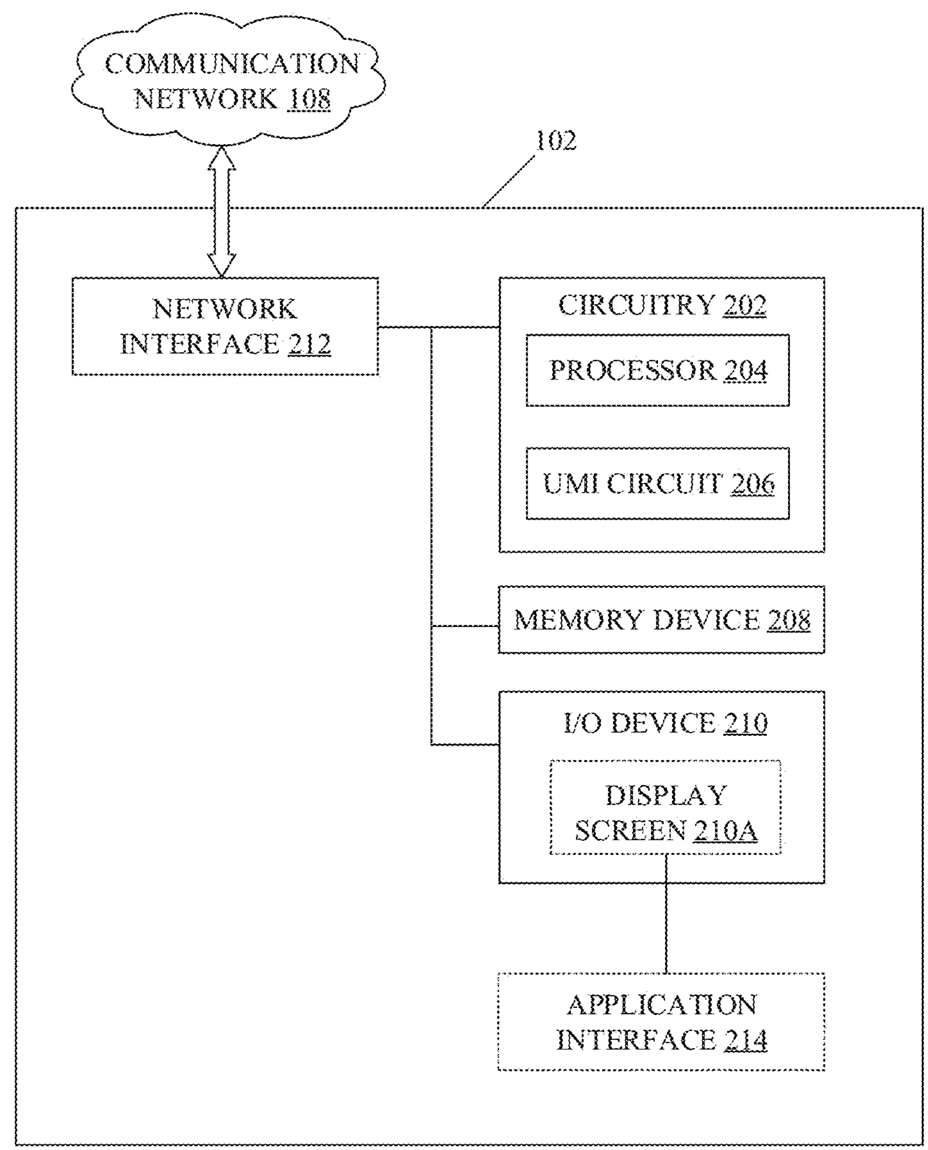
FIG. 2 is a block diagram that illustrates an exemplary apparatus for texturing a 3D model by UV map in-painting, in accordance with an embodiment of the disclosure.

FIG. 2 is a block diagram that illustrates an exemplary apparatus, in accordance with an embodiment of the disclosure. FIG. 2 is explained in conjunction with elements from FIG. 1. With reference to FIG. 2, there is shown the apparatus 102. The apparatus 102 may include circuitry 202, a processor 204, a UV Map In-painting (UMI) circuit 206, a memory device 208, an input/output (I/O) device 210, and a network interface 212. The UMI circuit 206 and the processor 204 may be a part of the circuitry 202. The I/O device 210 may include a display screen 210A, which may be utilized to render an application interface 214. The circuitry 202 may be communicatively coupled to the memory device 208 and the I/O device 210. The circuitry 202 may be configured to communicate with the server 104 and the image-capture device 106, by use of the network interface 212.

The circuitry 202 may comprise suitable logic, circuitry, and interfaces that may be configured to texture the 3D model. The circuitry 202 may be configured to generate the first UV map of the stored 3D model 110A. The circuitry 202 may further be configured to in-paint the first UV map based on the captured plurality of color images. Further, the circuitry 202 may be configured to generate the second UV map based on the texturized region-of-interest of the first UV map. The circuitry 202 may be configured to utilize the processor 204 and the UMI circuit 206 to execute the aforementioned operations.

The processor 204 may comprise suitable logic, circuitry, and interfaces that may be configured to execute a set of instructions stored in the memory device 208. The processor 204 may be implemented based on a number of processor technologies known in the art. Examples of the processor 204 may be a Graphical Processing Unit (GPU), a Central Processing Unit (CPU), X86-based processor, a Reduced Instruction Set Computing (RISC) processor, an Application-Specific Integrated Circuit (ASIC) processor, a Complex Instruction Set Computing (CISC) processor, other processors, and the like.

The UMI circuit 206 may comprise suitable logic, circuitry, and interfaces that may be configured to in-paint the generated first UV map. The UMI circuit 206 may be configured to apply color values to the generated first UV map. The color values may be applied based on the correspondence between the first color image of the captured plurality of color images and the first UV map. The UMI circuit 206 may be configured to texturize the set non-textured regions within the textured regions of the first UV map. The UMI circuit 206 may be implemented as a separate processor or circuitry in the apparatus 102. The UMI circuit 206 and the processor 204 may be implemented as an integrated processor or a cluster of processors that perform the functions of the UMI circuit 206 and the processor 204. The UMI circuit 206 may be implemented as a set of instructions stored in the memory device 208, which upon execution by the processor 204, may perform the functions and operations for the apparatus 102.

The memory device 208 may comprise suitable logic, circuitry, and interfaces that may be configured to store a set of instructions executable by the processor 204. The memory device 208 may be configured to store data of operating systems and associated applications. The memory device 208 may be further configured to store a 3D model, such as the 3D model 110A and texture data, such as the texture data 112. Examples of implementation of the memory device 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The I/O device 210 may comprise suitable logic, circuitry, and interfaces that may be configured to receive an input from the user 114 and provide an output to the user 114 based on received input from the user 114. For example, the I/O device 210 may be utilized to initialize the operation to texture the 3D model based on a request from the user 114. The I/O device 210 may comprise various input and output devices, which may be configured to communicate with the processor 204. Examples of the I/O device 210 may include, but are not limited to, a touch screen, a keyboard, a mouse, a joystick, a microphone, a display screen (for example, the display screen 210A), and a speaker.

The display screen 210A may comprise suitable logic, circuitry, and interfaces that may be configured to render the application interface 214 at the display screen 210A, for display of a textured 3D model of the user 114. In accordance with an embodiment, the display screen 210A may be configured to receive input from the user 114. In such a scenario, the display screen 210A may be a touch screen, which may enable the user 114 to provide input. The touch screen may be at least one of a resistive touch screen, a capacitive touch screen, or a thermal touch screen. In accordance with an embodiment, the display screen 210A may receive the input through a virtual keypad, a stylus, a gesture-based input, or a touch-based input. The display screen 210A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 210A may refer to a display screen of a smart-glass device, a see-through display, a projection-based display, an electrochromic display, or a transparent display.

The network interface 212 may comprise suitable logic, circuitry, and interfaces that may be configured to facilitate communication between the apparatus 102, the server 104, and the image-capture device 106, via the communication network 108. The network interface 212 may be implemented by use of various known technologies to support wired or wireless communication of the apparatus 102 with the communication network 108. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 214 may correspond to a user interface (UI) rendered on a display screen, such as the display screen 210A. The application interface 214 may display the textured 3D model of the user 114. The textured 3D model of the user 114 may be viewed from a plurality of view-points, by use of the application interface 214. An example of the application interface 214 may include, but is not limited to, a graphical user interface (GUI).

The functions or operations executed by the apparatus 102, as described in FIG. 1, may be performed by the circuitry 202, processor 204, and the UMI circuit 206. The operations executed by the circuitry 202, processor 204, and the UMI circuit 206 are further described, for example, in the FIGS. 3A to 3G, 4A, and 4B.

Figure 3A:
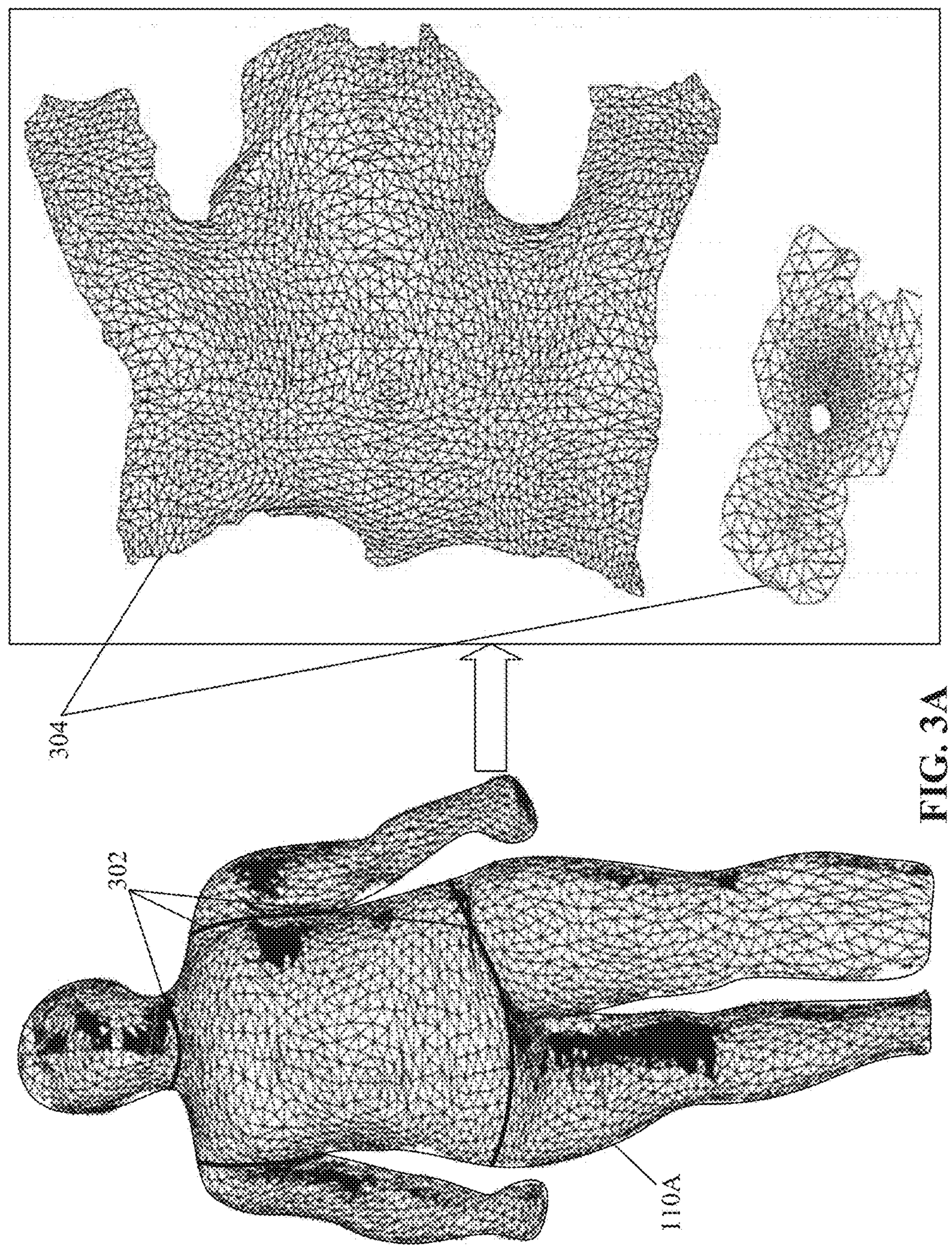
FIGS. 3A, 3B, 3C, 3D, 3E, 3F and 3G, collectively, illustrate exemplary operations for texturing a 3D model by UV map in-painting, in accordance with an embodiment of the disclosure.

FIGS. 3A, 3B, 3C, 3D, 3E, 3F and 3G, collectively, illustrate exemplary operations for texturing of a 3D model by UV map in-painting, in accordance with an embodiment of the disclosure. FIGS. 3A to 3G are explained in conjunction with elements from FIGS. 1 and FIG. 2. FIG. 3A illustrates unwrapping of the 3D model based on the detected seams, in accordance with an embodiment of the disclosure. With reference to FIG. 3A, there is shown the 3D model 110A, a plurality of seams 302 and a set of unwrapped regions 304 of the 3D model 110A.

In accordance with an embodiment, the circuitry 202 may be configured to receive the stored 3D model 110A of the plurality of 3D models from the 3D model repository 110. The stored 3D model 110A may be non-textured 3D model (devoid of any texture). The circuitry 202 may be configured to detect the plurality of seams 302 for a plurality of regions of the 3D model 110A. The plurality of seams 302 may be markings that may divide the 3D model 110A in the plurality of regions on a 2D surface plane. The circuitry 202 may be further configured to unwrap the 3D model 110A along the detected plurality of seams 302. The set of unwrapped regions 304 of the 3D model 110A may be obtained based on unwrap of the 3D model 110A along the detected plurality of seams 302. The set of unwrapped regions 304 may comprise the 3D model 110A unwrapped and divided in the plurality of regions, such as the leg region, the hand region, the upper body region, and the like.

Figure 3B:
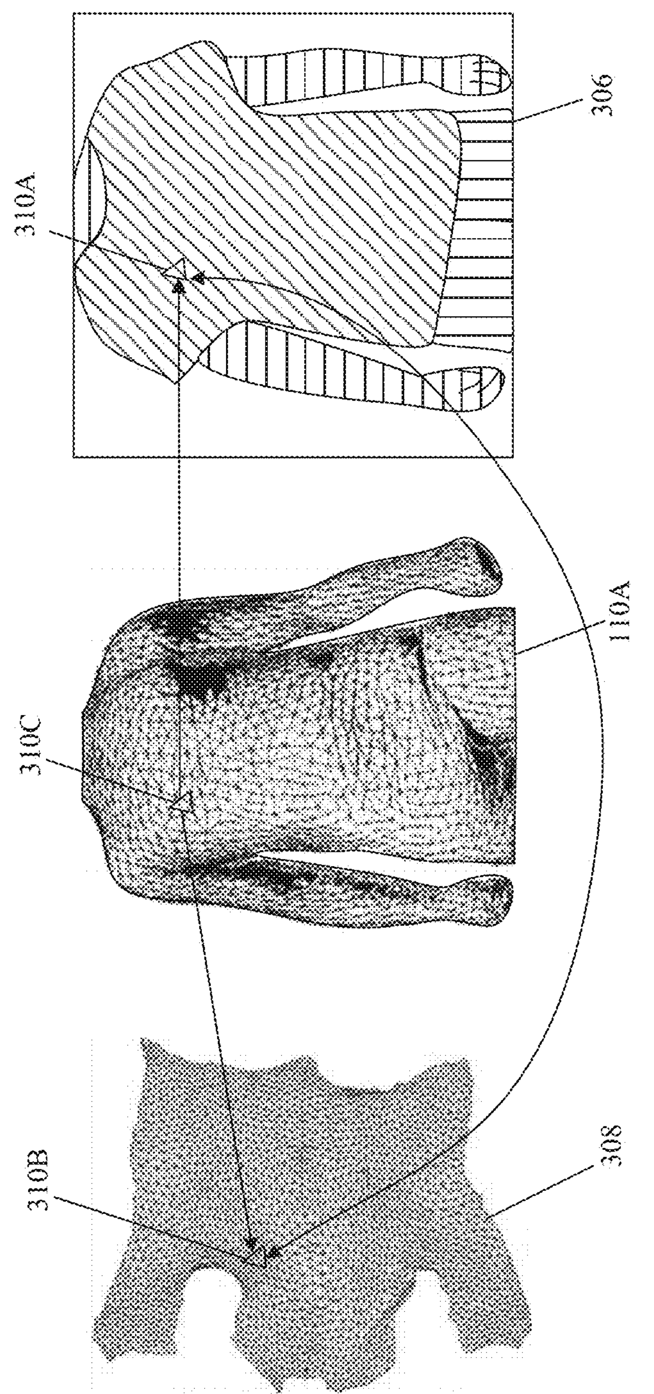

FIG. 3B illustrates exemplary operation of generation of the initial texture of the first UV map, in accordance with an embodiment of the disclosure. With reference to FIG. 3B, there is shown the 3D model 110A, a first color image 306, a first UV map 308, and a mapping among a first triangle 310A, a second triangle 310B, and a third triangle 310C.

The circuitry 202 may be configured to estimate the correspondence between the first color image 306 of the captured plurality of color images and the first UV map 308. The correspondence may be estimated based on 3D to 2D projection of the 3D coordinates of the 3D model 110A to a 2D surface plane. The 3D coordinates of the 3D model 110A may be mapped to the 2D surface of the first UV map 308 based on 2D coordinates of the first color image 306 and a focal length of the image-capture device 106. The circuitry 202 may be further configured to map each triangle of a plurality of triangles of the first color image 306, such as the first triangle 310A, to a corresponding triangle of the first UV map 308, such as the second triangle 310B. The mapping may be done based on coordinates (position) of a corresponding triangle of the plurality of triangles of the 3D model 110A, such as the third triangle 310C, and a similar position coordinate (such as the second triangle 310B) in the first UV map 308. The circuitry 202 may be further configured to compute an affine transformation between each triangle of the plurality of triangles of the first UV map 308, such as the second triangle 310B and corresponding triangle in the first color image 306, such as the first triangle 310A. The size of each triangle of the first UV map 308, such as the second triangle 310B, may be different from the size of the corresponding triangle of the first color image 306, such as the first triangle 310A. The affine transformation may be estimated, for example, by equation (1) as given below:

$$R\begin{bmatrix} a_i \\ b_i \end{bmatrix} + T = \begin{bmatrix} x_i \\ y_i \end{bmatrix} \quad (1)$$

where, "$a_i$" and "$b_i$" represents the coordinates of the vertices of the second triangle 310B of the first UV map 308;

"$x_i$" and "$y_i$" represents the coordinates of the vertices of the first triangle 310A of the first color image 306; and "R" and "T" represents the rotation and translation applied on the second triangle 310B of the first UV map 308.

The circuitry 202 may be further configured to apply color values to each triangle of the plurality of triangles of the first UV map 308, such as the second triangle 310B based on the computed affine transformation and the first color image 306. An initial texture of the first UV map 308 may be generated based on the applied color values to the first UV map 308.

Figure 3C:
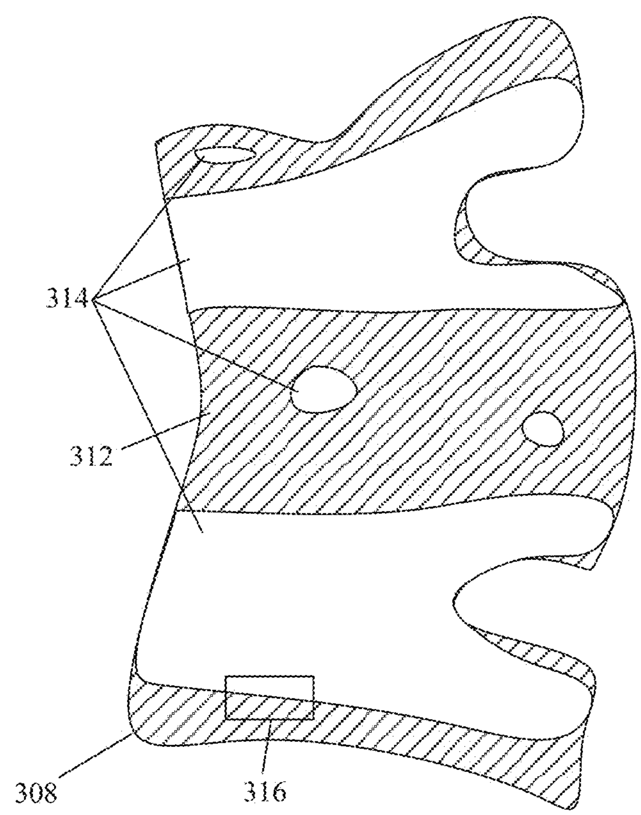

FIG. 3C illustrates exemplary initial texture of the first UV map 308, in accordance with an embodiment of the disclosure. With reference to FIG. 3C, there is shown the initial texture of the first UV map 308, a textured region 312, a set of non-textured regions 314 within the textured region 312. There is also shown an area 316 in the first UV map 308 that includes a boundary between the textured region 312 and one non-textured region of the set of non-textured regions 314. The initial texture of the first UV map 308 may comprise the textured region 312 and the set of non-textured regions 314 within the textured region 312. The color values may be absent for the set of non-textured regions 314 of the initial texture of the first UV map 308. The area 316 of the first UV map 308 may represent an area on the first UV map 308 that comprises the textured region 312 and a first non-textured region of the set of non-textured regions 314 together. The area 316 of the first UV map 308 is further shown in FIG. 3D, to explain exemplary operations of texturing (or in-painting) of the first non-textured region in the area 316.

Figure 3D:
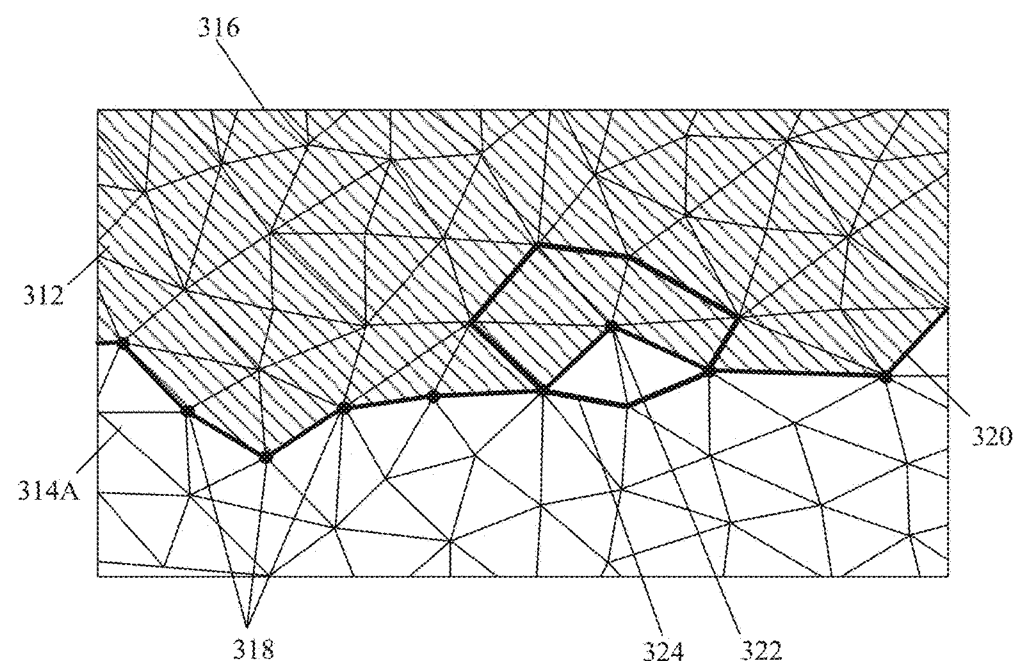

FIG. 3D illustrates the area 316 of the first UV map 308, in accordance with an embodiment of the disclosure. With reference to FIG. 3D, there is shown the area 316 of the first UV map 308, the textured region 312 (texture represented by line patterns), a first non-textured region 314A of the set of non-textured regions 314, a set of vertices 318 that lie on a boundary 320, a first vertex 322 from the set of vertices 318 and a region of interest 324. The set of vertices 318 may correspond to a plurality of points (such as a first vertex 322 (or a first point) that lie on the boundary 320.

The UMI circuit 206 may be configured to acquire the set of vertices 318 that lie on the boundary 320 between the textured region 312 and the first non-textured region 314A of the set of non-textured regions 314, from a plurality of vertices of the first UV map 308. The UMI circuit 206 may be configured to determine a priority level for each vertex of the acquired set of vertices 318 that lie on the boundary 320 between the textured region 312 and the first non-textured region 314A of the set of non-textured regions 314. The priority level may be determined to obtain an order of in-painting of the first UV map 308. A first vertex 322 with a higher priority level than other vertices from the set of vertices 318 may be selected first, for in-painting of the first UV map 308. The operation for determination of the priority level of each vertex of the set of vertices 318 on the boundary 320 is further described, for example, in FIG. 3E. The UMI circuit 206 may be further configured to detect a region-of-interest 324 around the first vertex 322 based on the determined priority level.

Figure 3E:
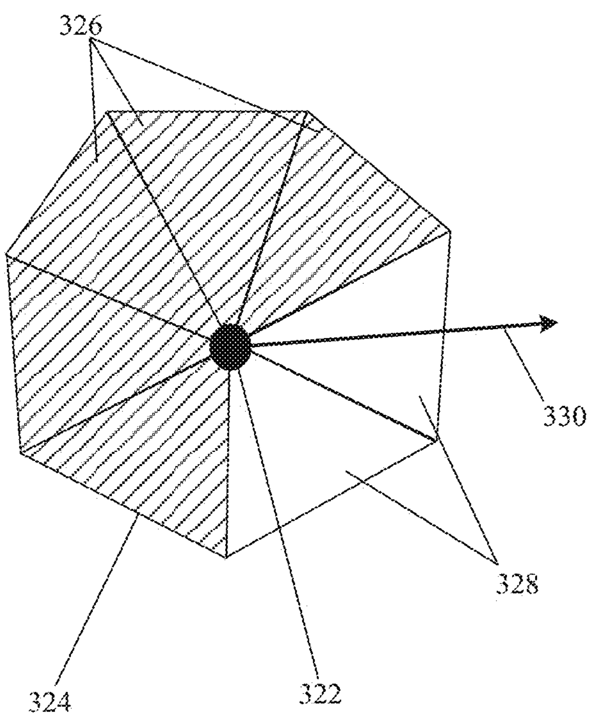

FIG. 3E illustrates exemplary operations for determination of the priority level of each vertex of the set of vertices 318 on the boundary 320 of the first UV map 308, in accordance with an embodiment of the disclosure. With reference to FIG. 3E, there is shown the region-of-interest 324 around the first vertex 322, a plurality of textured triangles 326 and a plurality of non-textured triangles 328 connected to the first vertex 322, and an angle bisector 330 for a portion that includes the plurality of non-textured triangles 328 connected to the first vertex 322. The first vertex 322 may be selected based on the priority level that may be determined for each vertex of the set of vertices 318 that lie on the boundary 320 of the first UV map 308 (as shown in FIG. 3D). The priority level may be determined based on a confidence level of the first vertex 322 of the set of vertices 318 and a color gradient level of a plurality of triangles around the first vertex 322. The priority level may be determined, for example, by the equation (2) as given below:

$$P(p)=C(p).D(p) \tag{2}$$

where, p refers to the set of vertices 318 on the boundary 320;

P(p) refers to the priority level of each vertex of the set of vertices 318 on the boundary 320;

C(p) refers to the confidence level of each vertex of the set of vertices 318 on the boundary 320; and D(p) refers to the color gradient level of the plurality of triangles around each vertex of the set of vertices 318 on the boundary 320.

The UMI circuit 206 may be configured to compute the confidence level of the first vertex 322 based on the plurality of textured triangles 326 and the plurality of non-textured triangles 328 connected to the first vertex 322. A textured triangle may be assigned the confidence level as "1" and a non-textured triangle may be assigned the confidence level as "0". The confidence level of the first vertex 322 may be computed based on a ratio of the number of textured triangles 326 connected to the first vertex 322 and a total number of triangles connected to the first vertex 322. For example, as shown in FIG. 3E, the number of textured triangles may be "5", the number of non-textured triangles may be "2" and the total number of triangles around the first vertex 322 may be "7". The confidence level may be computed to be "5/7".

The UMI circuit 206 may be configured to compute a color gradient level of the plurality of triangles connected to the first vertex 322 that lie on the boundary 320. The color gradient level may be computed based on at least a gradient of color values of the plurality of triangles connected to the first vertex 322 that lie on the boundary 320. The computation of the color gradient level may further be based on the angle bisector 330 of the portion that includes the plurality of non-textured triangles 328 connected to the first vertex 322. The color gradient level may be computed, for example, by the equation (3) as given below:

$$D(p) = \frac{|\nabla I_p^{\perp} \cdot n_p|}{\alpha} \tag{3}$$

where, D(p) represents the color gradient level;

$\nabla I_p^{\perp}$ represents the gradient of color values of the plurality of triangles connected to the first vertex 322 that lie on the boundary 320;

$n_p$ represents the angle bisector 330 of the portion that includes the plurality of non-textured triangles 328 connected to the first vertex 322; and $\alpha$ represents a constant parameter.

The UMI circuit 206 may be configured to select the first vertex 322 based on the determined priority level. The in-painting of the first UV map 308 may begin with the selected first vertex 322. Further, the UMI circuit 206 may be configured to detect the region-of-interest 324 around the first vertex 322 of the set of vertices that lie on the boundary 320. The region-of-interest 324 may comprise a first portion of the textured region 312 and a first portion of the first non-textured region 314A. The first portion of the textured region 312 may comprise the plurality of textured triangles 326 and the first portion of the first non-textured region 314A may comprise the plurality of non-textured triangles 328. The UMI circuit 206 may be further configured to in-paint the first UV map 308 by texturing the plurality of non-textured triangles 328 of the first portion of the first non-textured region 314A of the first UV map 308.

Figure 3F:
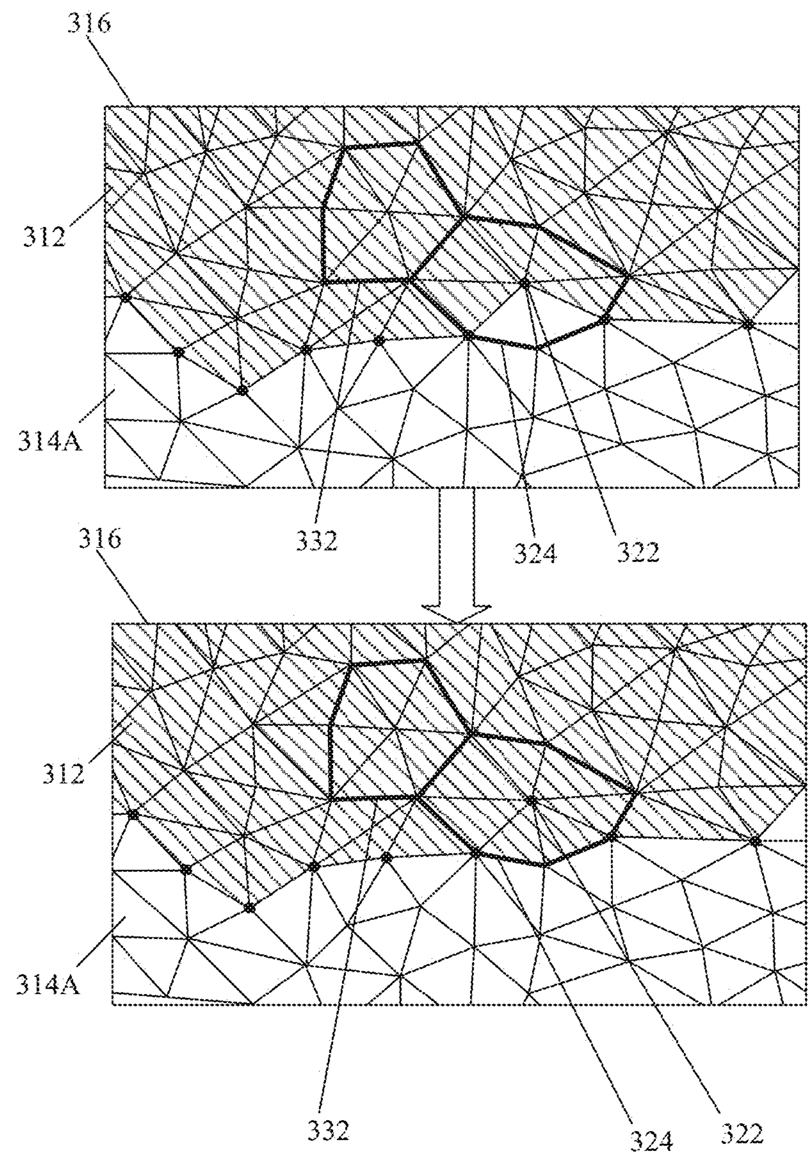

FIG. 3F illustrates exemplary operations to in-paint the first UV map 308 by texturing the plurality of non-textured triangles 328 of the first portion of the first non-textured region 314A of the first UV map 308. With reference to FIG. 3F, there is shown the region-of-interest 324 and a reference patch 332. The UMI circuit 206 may be configured to determine texture information of a specific patch of a plurality of patches of the textured region 312 of the first UV map 308. The texture information of the specific patch may be determined based on a comparison of the detected region-of-interest 324 with the plurality of patches of the textured region 312 of the first UV map 308. The UMI circuit 206 may select the specific patch for in-painting the region-of-interest 324 based on the determined texture information of the specific patch. The selected specific patch may be the reference patch 332 in the textured region 312 that may have least difference from the detected region-of-interest 324. A plurality of parameters (for e.g. color or size, number of textured triangles and number of non-textured triangles) of the region-of-interest 324 may be compared with a corresponding plurality of parameters of the reference patch 332. The reference patch 332 may be selected based on rotation of the reference patch 332 in order to match (or map) with the region-of-interest 324. Further, the UMI circuit 206 may be configured to texturize the region-of-interest 324 based on the selected reference patch 332. The selected reference patch 332 may be mapped on the region-of-interest 324. The UMI circuit 206 may texturize the region-of-interest 324 based on an application of the detected texture information of the reference patch 332 to the plurality of non-textured triangles 328 of the first portion of the first non-textured region 314A. Typically, a 3D model rendering is very computational intensive process. In certain cases, even an additional processor, such as a graphics processing unit (GPU) is used in combination to a CPU (such as the processor 204) for graphics processing. The UMI circuit 206 in-paints the holes (for e.g., the set of non-textured regions within the textured region 312) of the UV map (such as the first UV map 308) by considering certain selected triangles (such as the second triangle 310B) of the triangular mesh and a polygonal shaped reference patch (such as the selected reference patch 332). Therefore, the in-painting process of the disclosed apparatus uses triangles as basic units of in-painting instead of pixels that are used in conventional systems. Consequently, the UMI circuit 206 reduces the processing time for texturing of a 3D model (such as the 3D model 110A), and free-up resources for GPU specifically for rendering the textured 3D model with increased photorealism. Thus, the UMI circuit 206 is cost-effective, and reduces the cost or a need of higher versions of GPU hardware, which are otherwise costly without sacrificing quality. Further, the UMI circuit 206 also considers the 3D adjacency and avoids stretching of the UV map (such as the first UV map 308) as triangles of the triangular mesh are utilized as the basic unit while in-painting the UV map.

Figure 3G:
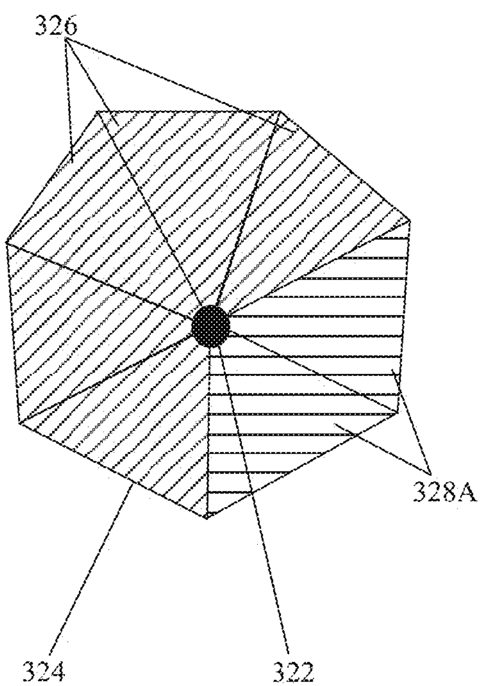

FIG. 3G illustrates exemplary operations of updating of confidence level of the plurality of non-textured triangles 328 of the first portion of the first non-textured region 314A. With reference to FIG. 3G, there is shown a texturized region-of-interest 324, the plurality of textured triangles 326 and a plurality of texturized non-textured triangles 328A. The UMI circuit 206 may be configured to update the confidence level of the plurality of texturized non-textured triangles 328A of the first portion of the first non-textured region 314A after texturizing of the region-of-interest 324, based on the computed confidence level of the first vertex 322 that lie on the boundary 320. The confidence level of the plurality of texturized non-textured triangles 328A of the first portion of the first non-textured region 314A, after the texturizing of the region-of-interest 324, may be equal to the computed confidence level of the first vertex 322. For example, as shown in FIG. 3G, the confidence level of the first vertex 322 may be "5/7" (computation described previously in FIG. 3E), therefore, the UMI circuit 206 may update the confidence level of the texturized non-textured triangles 328A as equal to "5/7". The UMI circuit 206 may be further configured to generate a second UV map based on the texturized region-of-interest 324 of the first UV map 308. Further, the UMI circuit 206 may texture the 3D model 110A based on the generated second UV map. The texturing of the 3D model 110A may increase photorealism of the 3D model 110A. Photorealism may indicate the extent of reality or real life-like appearance in the visual representation of the 3D model 110A in computer graphics technology. The textured 3D model may be a highly detailed and vivid depiction of the 3D model, such as a human 3D model, in the 3D computer graphics environment.

FIGS. 3A to 3G illustrate in-painting of certain non-textured region for one region-of-interest, such as the region-of-interest 324, of the plurality of region-of-interests in the first UV map 308. Similar to the texturing (in-painting) of the non-textured region for one region-of-interest, other non-textured regions of the set of non-textured regions in the first UV map 308 may be textured iteratively. Further, similar to the first UV map 308, other first UV maps of a plurality of first UV maps obtained by unwrapping, may be textured to obtain second UV maps. The iterative process for in-painting of the plurality of first UV maps using texture data to obtain completely textured 3D model, may be further understood by FIGS. 4A and 4B.

Figure 4A:
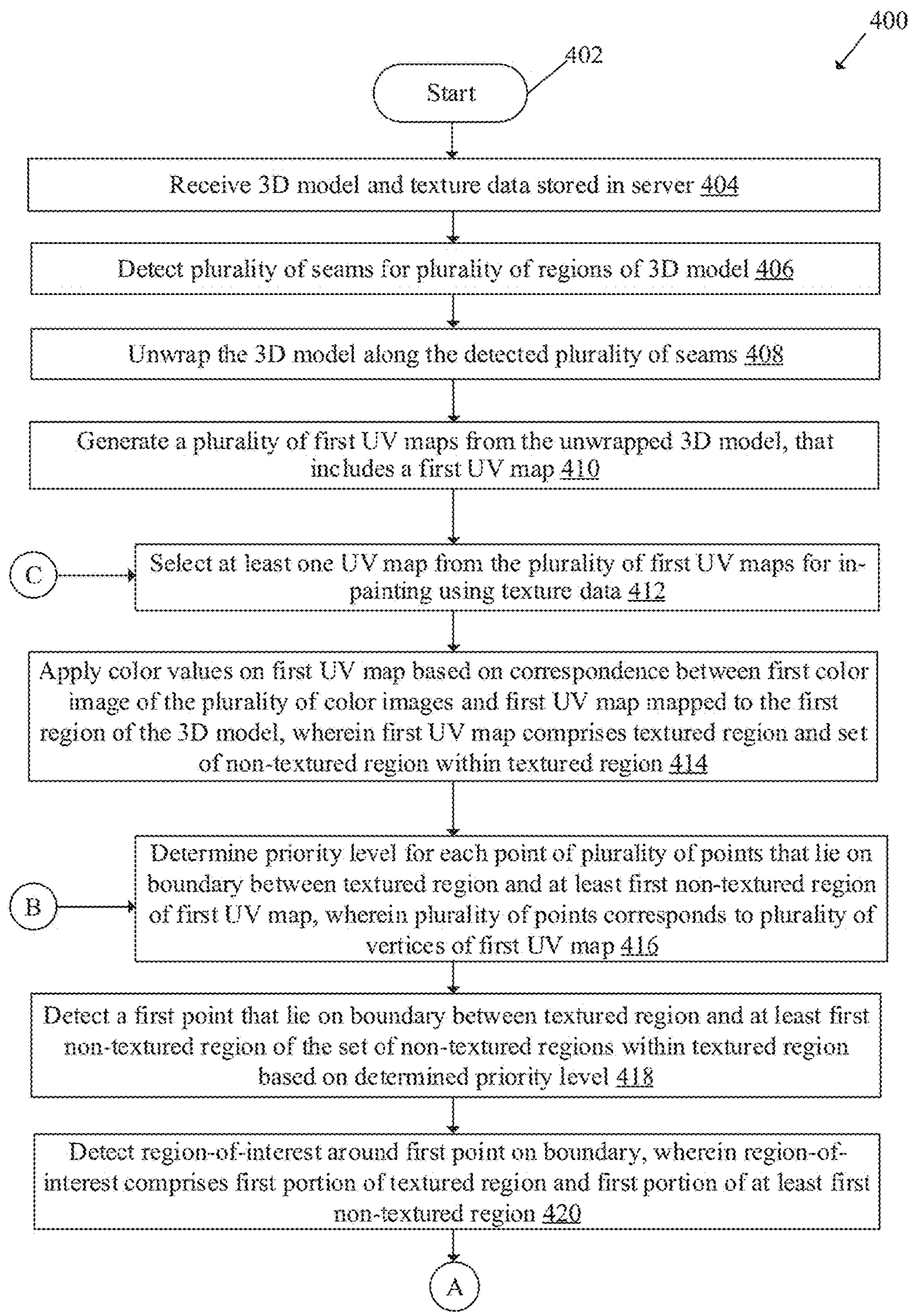
FIGS. 4A and 4B, collectively, depict a flowchart that illustrates exemplary operations for texturing a 3D model by UV map in-painting, in accordance with an embodiment of the disclosure.
Figure 4B:
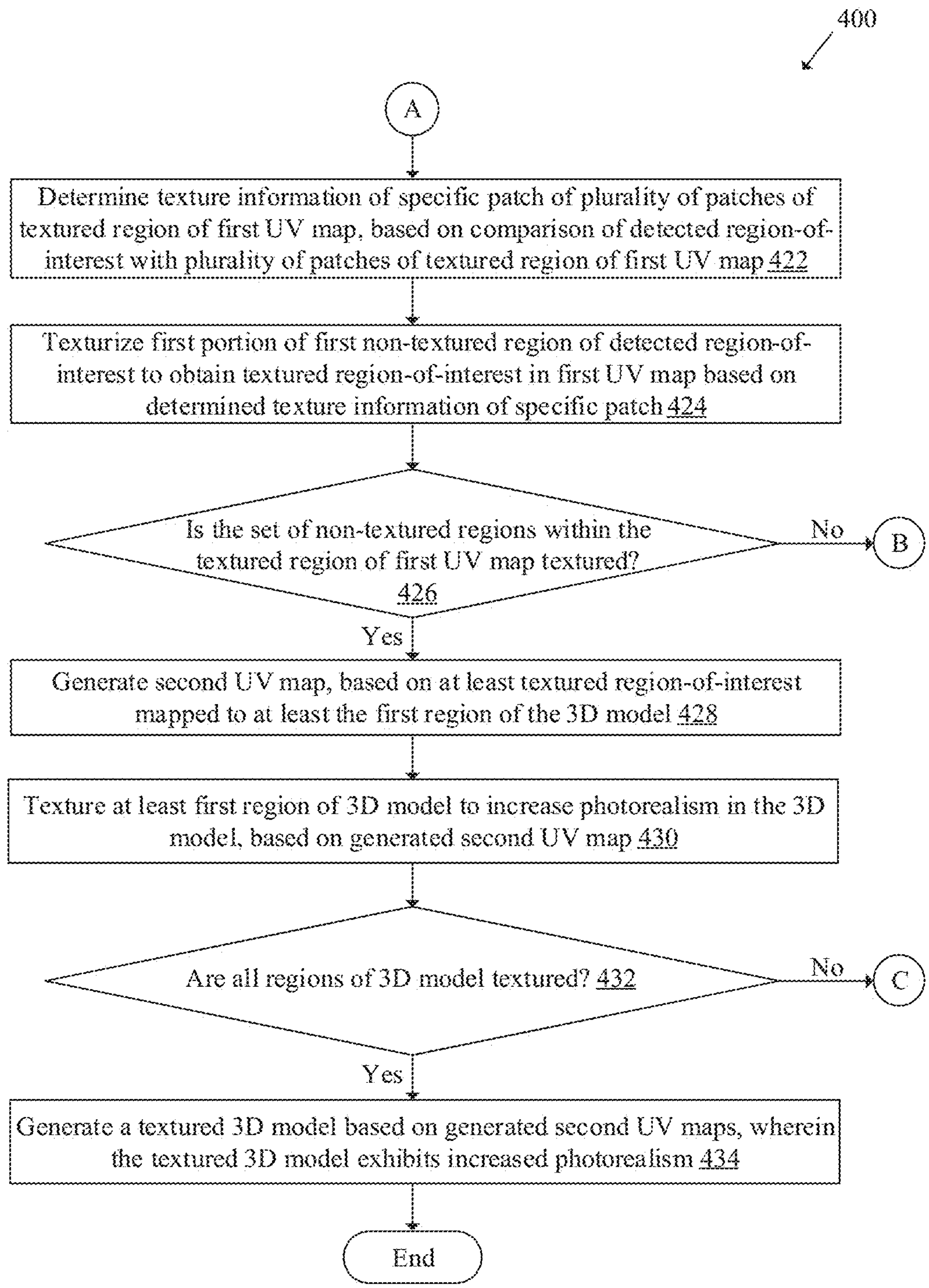

FIGS. 4A and 4B are flowcharts that collectively illustrate exemplary operations of texturing a 3D model by UV map in-painting, in accordance with an embodiment of the disclosure. With reference to FIGS. 4A and 4B, there is shown a flowchart 400. The flowchart 400 is described in conjunction with FIGS. 1, 2, and 3A to 3G. The operations from 404 to 426 may be implemented in the apparatus 102. The operations of the flowchart 400 may start at 402 and proceed to 404.

At 404, 3D model 110A and texture data 112 may be received from the server 104. The 3D model 110A and the texture data 112 may be received via the communication network 108. The 3D model 110A may be a computer graphics model from a plurality of 3D models stored in the 3D model repository 110 in the server 104. The texture data 112 may comprise a plurality of color images that may be captured by the image-capture device 106.

At 406, a plurality of seams for a plurality of regions of the 3D model 110A may be detected. The circuitry 202 may be configured to detect the plurality of seams 302 for the plurality of regions of the 3D model 110A. The plurality of seams 302 may be a plurality of lines that divide the 3D model 110A in the plurality of regions. For example as shown in FIG. 3A, the plurality of seams 302 may divide the 3D model 110A of a human body in the plurality of regions such as a leg region, a hand region, an upper body region, and the like.

At 408, the 3D model 110A may be unwrapped along the detected plurality of seams 302. The circuitry 202 may be configured to unwrap the 3D model 110A along the detected plurality of seams 302 on a 2D surface plane. For example, as shown in FIG. 3A, the set of unwrapped regions 304 may be obtained based on unwrap of the 3D model 110A along the detected plurality of seams 302 for the plurality of regions of the 3D model 110A.

At 410, a plurality of first UV maps may be generated based on the unwrapped 3D model 110A. The plurality of first UV maps may include a first UV map. The circuitry 202 may be configured to generate a 2D layout of the plurality of first UV maps, such as the first UV map 308, based on the unwrapped 3D model 110A. For example, as shown in FIG. 3B, a 2D layout of the first UV map 308 may represent the 3D model 110A on a 2D surface plane. The 2D layout of the first UV map 308 may be a 2D mesh that comprises a plurality of points of a plurality of polygons, such as a plurality of triangles.

At 412, at least one UV map from the plurality of first UV maps may be selected for in-painting. Each of the plurality of first UV maps may comprise textured regions and a set of non-textured regions within textured region. The set of non-textured regions within textured region may be holes that are devoid of texture and undesirable artifacts.

At 414, color values may be applied on the first UV map 308 (such as the selected first UV map) based on correspondence between the first color image 306 of the plurality of color images and first UV map 308 mapped to the first region of the 3D model 110A. The first UV map 308 may comprise the textured region 312 and the set of non-textured regions 314 within textured region 312. For example, as shown in FIG. 3B, the circuitry 202 may be configured to apply color values to the first UV map 308 based on the color values of the first color image 306 and the computed affine transformation.

At 416, priority level for each point of the plurality of points that lie on the boundary between the textured region 312 and at least first non-textured region 314A of first UV map 308 may be determined. The plurality of points may correspond to the plurality of vertices of the plurality of triangles of the first UV map 308. The UMI circuit 206 may be configured to determine the priority level of the plurality of points based on a confidence level of each point and a color gradient level of a plurality of triangles around each point. For example, as shown in FIG. 3E, the UMI circuit 206 may determine the priority level of the first vertex 322 based on the confidence level of the first vertex 322 and the color gradient level of the plurality of triangles around the first vertex 322.

At 418, a first point (such as the first vertex 322) that lie on the boundary between the textured region 312 and at least first non-textured region 314A of the set of non-textured regions 314 within textured region 312, may be detected, based on the determined priority level. The UMI circuit 206 may be configured to detect the first point, such as the first vertex 322 based on the computed priority level, as shown in FIG. 3E.

At 420, a region-of-interest may be detected around the first point, such as the first vertex 322. The UMI circuit 206 may be configured to detect the region-of-interest, such as the region-of-interest 324, that may comprise first portion of the textured region 312 and the first portion of at least first non-textured region 314A. For example, as shown in FIG. 3E, there is shown the region-of-interest 324 around the first vertex 322 that comprises the first portion of the textured region 312 and the first portion of the first non-textured region 314A. As shown in FIG.3E, the first portion of the textured region 312 comprises the plurality of textured triangles 326 and the first portion of the first non-textured region 314A comprises the plurality of non-textured triangles 328.

At 422, texture information of a specific patch of a plurality of patches of the textured region 312 of first UV map 308 may be determined, based on a comparison of the detected region-of-interest 324 with the plurality of patches of the textured region 312 of first UV map 308. The UMI circuit 206 may be configured to determine the texture information of the specific patch. The selected specific patch may be different for each detected region-of-interest of the plurality of region-of-interests. The selected specific patch may correspond to a reference patch, such as the reference patch 332. As shown in FIG. 3F, the UMI circuit 206 may be configured to compare a plurality of parameters (for e.g. color, size, number of textured triangles and number of non-textured triangles) of the region-of-interest 324 with a corresponding plurality of parameters of the reference patch 332.

At 424, a first portion of the first non-textured region 314A of the detected region-of-interest 324 may be textured to obtain textured region-of-interest in first UV map 308. The first portion of the first non-textured region 314A of the detected region-of-interest 324 may be textured based on determined texture information of the specific patch, such as the reference patch 332. For example, as shown in FIG. 3F, the UMI circuit 206 may be configured to texture the first portion of the first non-textured region 314A of the detected region-of-interest 324 based on the reference patch 332. After the first portion of the first non-textured region 314A of the detected region-of-interest 324 is textured to obtain textured region-of-interest in first UV map 308, the UMI circuit 206 may be configured to update the confidence level of the plurality of non-textured triangles (such as the plurality of non-textured triangles 328) of the first portion of the first non-textured region (such as the first non-textured region 314A). The update in priority level represents which region-of-interest among the plurality of region-of-interests in the first UV map 308 is to be selected on priority for in-painting.

At 426, it may be checked whether the set of non-textured regions within the textured region of at least one selected UV map, such as the first UV map 308, is textured. In cases where all the non-textured regions (i.e., the set of non-textured regions) in the selected UV map, such as the first UV map 308, are textured, the control passes to 428. In cases where some of the set of non-textured regions (i.e., non-textured regions) in the selected UV map, such as the first UV map 308, are not textured, the control returns to 416. In such a case, in each iteration, based on at least the update of the confidence level of the plurality of non-textured triangles, the priority level for each point of the plurality of points that lie on the boundary between the textured region 312 and at least first non-textured region 314A of first UV map 308 may be further updated. The plurality of points corresponds to the plurality of vertices of the plurality of triangles of the first UV map 308. The priority level for each point of the plurality of points that lie on the boundary may further be updated based on a color gradient level of the plurality of triangles around each point of the plurality of points. The order of texturing of the different region-of-interests of the plurality of region-of-interests may be determined, based on the update in the priority level of each point of the plurality of points that lie on the boundary between the textured region 312 and at least first non-textured region 314A of first UV map 308. Thus, the UMI circuit 206 may be configured to iteratively execute the operations 416 to 424 as shown in FIG. 4A and 4B until the set of non-textured regions within the textured region (i.e., all the holes and undesired artifacts in a first UV map) of the selected UV map, such as the first UV map 308, are textured.

At 428, a second UV map may be generated based on the at least the textured region-of-interest mapped to at least the first region of the 3D model. In some embodiments, the second UV map may be generated when all the non-textured regions (such as the set of non-textured regions within the textured region) of the selected UV map, such as the first UV map 308, are textured. The UMI circuit 206 may be configured to generate the second UV map based on the textured region-of-interest, such as the region-of-interest 324 and other textured region-of-interests of the plurality of region-of-interests of the first UV map. The generated second UV map may be further utilized to texture at least one region of the 3D model 110A.

At 430, at least the first region of the 3D model 110A may be textured to increase photorealism in the 3D model 110A, based on generated second UV map. The circuitry 202 may be configured to texture the first region of the 3D model 110A based on the generated second UV map.

At 432, it may be checked whether the plurality of regions (e.g. all the regions) of the 3D model 110A are textured. The circuitry 202 may be configured to texture the plurality of regions of the 3D model 110A based on the generated second UV maps. A plurality of second UV maps (one second UV map each for a corresponding first UV map of the plurality of first UV maps) similar to the second UV map (generated at 428) may be obtained through operations 414 to 430. In cases where the plurality of regions are textured, the control passes to 434. In cases where the plurality of regions are not textured, the control passes to 412 to select next UV map of the plurality of first UV maps in iterative manner until all the plurality of regions are textured. In some embodiments, the plurality of first UV maps may be selected and processed concurrently for the operations 414 to 430 for expedite the texturing of the 3D model.

At 434, a textured 3D model may be generated based on the generated second UV maps. Similar to the second UV map, other first UV maps may be textured accordingly, and the entire 3D model 110A, may be textured with increased photorealism. The textured 3D model may be more realistic than the 3D model 110A. Increased photorealism in the textured 3D model may increase the realistic visualization of the 3D model 110A. The control may pass to end.

In accordance with an embodiment of the disclosure, an apparatus for texturing of a 3D model by UV map in-painting is disclosed. The apparatus, such as the apparatus 102 (FIG. 1), may comprise a memory device (such as the memory device 208) and one or more circuits (such as the circuitry 202, processor 204 and the UMI circuit 206 (FIG. 2)) coupled to an image-capture device (such as the image-capture device 106). The memory device 208 may be configured to store a 3D model repository (such as the 3D model repository 110 (FIG. 1)) and a texture data images (such as the texture data 112 (FIG. 1)) comprising a plurality of color. The processor 204 may be configured to receive a 3D model (such as the 3D model 110A in FIG. 1) and the texture data 112. The circuitry 202 may be further configured to generate a first UV map (such as the first UV map 308 in FIG. 3B). The first UV map 308 may be a 2D layout of at least a first region of the 3D model 110A. The circuitry 202 may further apply color values on the first UV map 308, based on a correspondence between a first color image (such as the first color image 306 in FIG. 3B) of the plurality of color images and the first UV map 308 mapped to the first region of the 3D model 110A. The first UV map 308 may comprise a textured region (such as the textured region 312 in FIG. 3C) and a set of non-textured regions (such as the set of non-textured regions 314 in FIG. 3C) within the textured region 312. The UMI circuit 206 may be configured to detect a first point (such as the first vertex 322 in FIG. 3D) that lie on a boundary (such as the boundary 320 in FIG. 3D) between the textured region 312 and at least a first non-textured region (such as the first non-textured region 314A in FIG. 3D) of the set of non-textured regions 314 within the textured region 312. The UMI circuit 206 may be further configured to detect a region-of-interest (such as the region of interest 324 in FIG. 3D) around the first point on the boundary 320. The region-of-interest 324 may comprise a first portion of the textured region 312 and a first portion of the at least the first non-textured region 314A in the first UV map 308. The UMI circuit 206 may determine texture information of a specific patch (such as the reference patch 332 in FIG. 3F) of a plurality of patches of the textured region 312 of the first UV map 308, based on a comparison of the detected region-of-interest 324 with the plurality of patches of the textured region 312 of the first UV map 308. The UMI circuit 206 may further texturize the first portion of the first non-textured region 314A of the detected region-of-interest 324 to obtain a textured region-of-interest in the first UV map 308, based on the determined texture information of the specific patch. The UMI circuit 206 may be configured to generate a second UV map, based on at least the textured region-of-interest mapped to the at least the first region of the 3D model 110A. Further, the UMI circuit 206 may be configured to texture the at least the first region of the 3D model 110A to increase photorealism in the 3D model 110A, based on the generated second UV map.

In conventional systems, a 3D model may be textured by pixel based image in-painting techniques. The texture of the 3D models generated by such techniques may be unrealistic when visualized in the 3D computer graphics environment. The present disclosure may generate a textured 3D model based on UV map in-painting. In such cases, a UV map may be utilized to generate the textured 3D model. The generated UV map that may be a 2D triangle mesh structure comprising a plurality of triangles. Color values may be applied to the plurality of triangles of the UV map based on the plurality of color images. A non-textured region of the UV map may be textured based on a patch of a textured region of the UV map that comprises plurality of triangles. The disclosed apparatus 102 considers the 3D adjacency and avoids stretching of the UV map while in-painting the UV map, as the utilized patch (such as the specific patch that may be a polygon) conforms (or fits) to the shape, color values of the region that is to be textured in the first UV map. Thus, stretching effect is avoided. Further, shape of area selected for texture from color images is also triangular similar to the shape of the triangles of the UV map. Thus, the shape conformity is enhanced resulting in zero stretching of any image patch and increased photorealism in the textured 3D model that is textured by the disclosed apparatus and method. The 3D model may be textured based on the textured UV map. The texturing of the 3D model based on UV map in-painting may increase photorealism of the 3D model in the 3D computer graphics environment. The visualization of the textured 3D model may be realistic in the 3D computer graphics environment. The increased photorealism of the textured 3D model may result in a highly detailed depiction of the 3D model in the 3D computer graphics environment. Thus, a video, an animation, or a virtual-reality effect generated using such improved texturing in the 3D model, provides enhanced viewing experience to end users.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits communicatively coupled to an image-capture device. The set of instructions may be executable by the machine and/or the computer to perform the steps that comprise storage of a 3D model repository and a texture data comprising a plurality of color images. A first UV map may be generated from the 3D model. The first UV map may be a 2D layout of at least a first region of the 3D model. Color values may be applied on the first UV map based on a correspondence between a first color image of the plurality of color images and the first UV map mapped to the first region of the 3D model. The first UV map may comprise a textured region and a set of non-textured regions within the textured region. A first point may be detected that lies on a boundary between the textured region and at least a first non-textured region of the set of non-textured regions within the textured region. A region-of-interest around the first point on the boundary may be detected. The detected region-of-interest may comprise a first portion of the textured region and a first portion of the at least the first non-textured region in the first UV map. Texture information of a specific patch of a plurality of patches of the textured region of the first UV map may be determined, based on a comparison of the detected region-of-interest with the plurality of patches of the textured region of the first UV map. The first portion of the first non-textured region of the detected region-of-interest may be texturized to obtain a textured region-of-interest in the first UV map based on the determined texture information of the specific patch. A second UV map may be generated, based on at least the textured region-of-interest mapped to the at least the first region of the 3D model. The at least the first region of the 3D model may be textured to increase photorealism in the 3D model, based on the generated second UV map.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

The invention claimed is:

1. An apparatus for texturing of three-dimensional (3D) models, comprising:

a memory device configured to store a 3D model and a plurality of color images as texture data for the 3D model; and circuitry configured to:

generate a first UV map from the 3D model, wherein the first UV map is a two-dimensional (2D) layout of at least a first region of the 3D model;

apply color values on the first UV map based on a correspondence between a first color image of the plurality of color images and the first UV map mapped to the at least the first region of the 3D model, wherein the first UV map comprises a textured region and a set of non-textured regions within the textured region;

detect a first point that lie on a boundary between the textured region and at least a first non-textured region of the set of non-textured regions within the textured region;

detect a region-of-interest around the first point on the boundary, wherein the region-of-interest comprises a first portion of the textured region and a first portion of the at least the first non-textured region in the first UV map;

determine texture information of a specific patch of a plurality of patches of the textured region of the first UV map, based on a comparison of the detected region-of-interest with the plurality of patches of the textured region of the first UV map;

texturize the first portion of the at least the first non-textured region of the detected region-of-interest to obtain a textured region-of-interest in the first UV map based on the determined texture information of the specific patch;

generate a second UV map based on at least the textured region-of-interest mapped to the at least the first region of the 3D model; and texture the at least the first region of the 3D model to increase photorealism in the 3D model, based on the generated second UV map.

2. The apparatus according to claim 1, further comprising an image-capture device configured to capture the plurality of color images stored as texture data for the 3D model in the memory device.

3. The apparatus according to claim 1, wherein the circuitry is further configured to:

detect a plurality of seams for a plurality of regions of the 3D model; and unwrap the 3D model to a two-dimensional (2D) surface plane based on the detected plurality of seams, wherein the first UV map is generated based on the unwrap of the plurality of regions of the 3D model to the 2D surface plane.

4. The apparatus according to claim 1, wherein the first UV map comprises a triangular mesh having a plurality of triangles, and wherein the color values are applied on the first UV map based on an affine transformation between the plurality of triangles of the triangular mesh of the first UV map and a corresponding plurality of triangles in the first color image of the plurality of color images.

5. The apparatus according to claim 4, wherein the circuitry is further configured to determine a priority level for each vertex of a plurality of vertices that lie on the boundary between the textured region and the at least the first non-textured region, and wherein the plurality of vertices corresponds to a plurality of points including the first point that lie on the boundary.

6. The apparatus according to claim 5, wherein the circuitry is further configured to detect the region-of-interest around the first point on the boundary for in-painting from a plurality of region-of-interests based on the determined priority level for each vertex of the plurality of vertices that lie on the boundary.

7. The apparatus according to claim 5, wherein the priority level for each vertex of the plurality of vertices is determined, based on a confidence level of each vertex and a color gradient level of the plurality of triangles around each vertex.

8. The apparatus according to claim 7, wherein the circuitry is further configured to compute the confidence level of each vertex that lie on the boundary, based on a ratio of a number of textured triangles connected to each vertex and a total number of triangles connected to each vertex in a defined region-of-interest, and wherein the total number of triangles connected to each vertex includes at least one textured triangle and at least one non-textured triangle.

9. The apparatus according to claim 8, wherein the circuitry is further configured to compute the color gradient level of the plurality of triangles connected to each vertex that lie on the boundary, based on at least a gradient of color values of the plurality of triangles connected to each vertex that lie on the boundary and an angle bisector of each portion that includes the at least one non-textured triangle connected to each vertex.

10. The apparatus according to claim 1, wherein the circuitry is further configured to update a confidence level of each non-textured triangle connected to each vertex that lie on the boundary after the first portion of the at least the first non-textured region of the detected region-of-interest is texturized.

11. A method for texturing of three-dimensional (3D) models, comprising:

in an apparatus comprising a memory device and circuitry:

storing, by the memory device, a 3D model and a plurality of color images as texture data for the 3D model;

generating, by the circuitry, a first UV map from the 3D model, wherein the first UV map is a two-dimensional (2D) layout of at least a first region of the 3D model;

applying, by the circuitry, color values on the first UV map based on a correspondence between a first color image of the plurality of color images and the first UV map mapped to the at least the first region of the 3D model, wherein the first UV map comprises a textured region and a set of non-textured regions within the textured region;

detecting, by the circuitry, a first point that lie on a boundary between the textured region and at least a first non-textured region of the set of non-textured regions within the textured region;

detecting, by the circuitry, a region-of-interest around the first point on the boundary, wherein the region-of-interest comprises a first portion of the textured region and a first portion of the at least the first non-textured region in the first UV map;

determining, by the circuitry, texture information of a specific patch of a plurality of patches of the textured region of the first UV map, based on a comparison of the detected region-of-interest with the plurality of patches of the textured region of the first UV map;

texturizing, by the circuitry, the first portion of the at least the first non-textured region of the detected region-of-interest to obtain a textured region-of-interest in the first UV map, based on the determined texture information of the specific patch;

generating, by the circuitry, a second UV map, based on at least the textured region-of-interest mapped to the at least the first region of the 3D model; and texturing, by the circuitry, at least the first region of the 3D model to increase photorealism in the 3D model, based on the generated second UV map.

12. The method according to claim 11, further comprising capturing, by an image-capture device communicatively coupled to the apparatus, the plurality of color images stored as texture data for the 3D model in the memory device.

13. The method according to claim 11, further comprising:

detecting, by the circuitry, a plurality of seams for a plurality of regions of the 3D model; and unwrapping, by the circuitry, the 3D model to a two-dimensional (2D) surface plane based on the detected plurality of seams, wherein the first UV map is generated based on the unwrap of the plurality of regions of the 3D model to the 2D surface plane.

14. The method according to claim 11, wherein the first UV map comprises a triangular mesh having a plurality of triangles, and wherein the color values are applied, by the circuitry, on the first UV map based on an affine transformation between the plurality of triangles of the triangular mesh of the first UV map and a corresponding plurality of triangles in the first color image of the plurality of color images.

15. The method according to claim 14, further comprising determining, by the circuitry, a priority level for each vertex of a plurality of vertices that lie on the boundary between the textured region and the at least the first non-textured region, and wherein the plurality of vertices corresponds to a plurality of points including the first point that lie on the boundary.

16. The method according to claim 15, further comprising detecting, by the circuitry, the region-of-interest around the first point on the boundary for in-painting from a plurality of region-of-interests based on the determined priority level for each vertex of the plurality of vertices that lie on the boundary.

17. The method according to claim 15, wherein the priority level for each vertex of the plurality of vertices is determined, by the circuitry, based on a confidence level of each vertex and a color gradient level of the plurality of triangles around each vertex.

18. The method according to claim 17, further comprising computing, by the circuitry, the confidence level of each vertex that lie on the boundary, based on a ratio of a number of textured triangles connected to each vertex and a total number of triangles connected to each vertex in a defined region-of-interest, and wherein the total number of triangles connected to each vertex includes at least one textured triangle and at least one non-textured triangle.

19. The method according to claim 18, further comprising computing, by the circuitry, the color gradient level of the plurality of triangles connected to each vertex that lie on the boundary, based on at least a gradient of color values of the plurality of triangles connected to each vertex that lie on the boundary and an angle bisector of each portion that includes the at least one non-textured triangles connected to each vertex.

20. The method according to claim 11, further comprising updating, by the circuitry, a confidence level of each non-textured triangle connected to each vertex that lie on the boundary after the first portion of the at least the first non-textured region of the detected region-of-interest is texturized.

* * * * *